United States Patent
Brennan et al.

(10) Patent No.: US 10,094,312 B2
(45) Date of Patent: Oct. 9, 2018

(54) METHOD TO ADJUST AN OIL CONTROL VALVE ACTUATION RESPONSE TIME USING CYLINDER VALVE DIAGNOSTICS

(71) Applicant: GM GLOBAL TECHNOLOGY OPERATIONS LLC, Detroit, MI (US)

(72) Inventors: Daniel G. Brennan, Brighton, MI (US); Allen B. Rayl, Jr., Waterford, MI (US); Brian K. Kowalczyk, Howell, MI (US)

(*) Notice: Subject to any disclaimer, the term of this patent is extended or adjusted under 35 U.S.C. 154(b) by 224 days.

(21) Appl. No.: 15/355,492

(22) Filed: Nov. 18, 2016

(65) Prior Publication Data

US 2018/0142636 A1    May 24, 2018

(51) Int. Cl.
*F02D 41/00* (2006.01)
*F02D 41/14* (2006.01)
*F02D 41/22* (2006.01)
*F02D 41/26* (2006.01)
*F02D 41/24* (2006.01)

(52) U.S. Cl.
CPC ......... *F02D 41/0087* (2013.01); *F02D 41/00* (2013.01); *F02D 41/009* (2013.01); *F02D 41/1438* (2013.01); *F02D 41/221* (2013.01); *F02D 41/2403* (2013.01); *F02D 41/26* (2013.01); *F02D 2200/101* (2013.01); *F02D 2200/1015* (2013.01)

(58) Field of Classification Search
CPC ............... F02D 41/0087; F02D 41/009; F02D 41/1438; F02D 41/26
See application file for complete search history.

(56) References Cited

U.S. PATENT DOCUMENTS 9,175,613 B2 * 11/2015 Parsels .................... F02D 13/06
2002/0096139 A1 * 7/2002 Zheng .................... F01L 1/146
                                                                  123/198 F

FOREIGN PATENT DOCUMENTS

KR    2007-783351    *  9/2005

* cited by examiner

*Primary Examiner* — Kevin A Lathers

(57) ABSTRACT

A method to adjust an oil control valve actuation response time using cylinder valve diagnostic results includes commanding an engine cylinder to deactivate/reactive when conditions are met and then detecting if a deactivation/reactivation response time failure has occurred by analyzing the cylinder diagnostics results. If a predetermined number of failures are detected at the cylinder within a predetermined number of engine cycles then the engine controller operates to adjust the oil control valve response time to improve the response time accuracy.

20 Claims, 4 Drawing Sheets

METHOD TO ADJUST AN OIL CONTROL VALVE ACTUATION RESPONSE TIME USING CYLINDER VALVE DIAGNOSTICS

TECHNICAL FIELD

The present invention generally relates to intake and exhaust valve control systems for an internal combustion engine, and more particularly relates to a method to adjust an oil control valve actuation response time using cylinder valve diagnostics.

BACKGROUND

Fuel efficiency of internal combustion engines can be substantially improved by varying the displacement of the engine. This allows for the full torque to be available when required, yet can significantly reduce pumping losses and improve thermal efficiency by using a smaller displacement when full torque is not required. The most common method today of implementing a variable displacement engine is to deactivate a group of cylinders substantially simultaneously.

In this approach the intake and exhaust valves associated with the deactivated cylinders are kept closed and no fuel is injected when it is desired to bypass a combustion event. For example, a 6 cylinder variable displacement engine may deactivate half of the cylinders (i.e. 3 cylinders) so that it is operating using only the remaining 3 cylinders. Commercially available variable displacement engines typically support only two or at most three displacements.

An alternative engine control approach that varies the effective displacement of an engine is referred to as "skip fire" engine control or active fuel management (AFM). In general, skip fire engine control contemplates selectively skipping the firing of certain cylinders during selected firing opportunities. Thus, a particular cylinder may be fired during one engine cycle and then may be deactivated during the next engine cycle and then selectively deactivated or fired during the next. In this manner, even finer control of the effective engine displacement is possible.

In order to deactivate a cylinder, the intake valve is prevented from opening after the power stroke by an oil control valve system and after the exhaust gas charge is discharged from the cylinder. Following the power stroke, the oil control valve system operates to prevent the exhaust valve from opening.

When more power is called for, the intake valve is reactivated by the oil control valve system and a new intake charge is drawn into the cylinder. The exhaust valve is likewise reactivated by the oil control valve system and normal engine operation is resumed.

Alternately, the exhaust valve may be deactivated first. In this alternative embodiment, to deactivate a cylinder, the exhaust valve is prevented from opening after the power stroke by an oil control valve system and the exhaust gas charge is retained in the cylinder and compressed during the exhaust stroke. Following the exhaust stroke, the oil control valve system operates to prevent the intake valve from opening. The exhaust gas in the cylinder is expanded and compressed over and over again and acts like a gas spring, i.e., high pressure exhaust gas spring (HPES). As multiple cylinders are shut off at a time, the power required for compression of the exhaust gas in one cylinder is countered by the decompression of retained exhaust gas in another.

Again in this alternative embodiment, when more power is called for, the exhaust valve is reactivated first by the oil control valve system and the old exhaust gas is expelled during the exhaust stroke. The intake valve is likewise reactivated by the oil control valve system and normal engine operation is resumed.

As described, it is appreciated that accurate response timing of an oil control valve system is essential to the proper operation of active fuel management vehicles. However, current engine systems do not include a means to accurately detect and/or calibrate the time it takes for an oil valve control system to respond after a command is given to deactivate/reactivate the intake and exhaust valves of an engine cylinder. As such, it is desirable to have a method for detecting and calibrating the actuation response time for an oil control valve system of an active fuel management engine.

Furthermore, other desirable features and characteristics of the present exemplary embodiment will become apparent from the subsequent detailed description of the embodiment and the appended claims, taken in conjunction with the accompanying drawings and this background.

BRIEF SUMMARY

One or more exemplary embodiments address the above issue by providing a method to control intake and exhaust valve systems for an internal combustion engine. More particularly, apparatuses consistent with exemplary embodiments relate to a method to adjust an oil control valve actuation response time using cylinder valve diagnostics.

According to an aspect of an exemplary embodiment, a method to adjust an oil control valve actuation response time using cylinder valve diagnostics includes determining if conditions are met for cylinder deactivation. Still another aspect as according to the exemplary embodiment includes commanding at least one cylinder to deactivate when conditions for deactivation are met. And another aspect includes detecting if a high pressure exhaust charge spring is within the at least one deactivated cylinder.

Still another aspect of the exemplary embodiment includes detecting if the at least one cylinder has failed to deactivate if a high pressure exhaust charge spring is not detected. And another aspect includes detecting if the at least one cylinder has failed to deactivate on a next engine cycle if the at least one cylinder failed to deactivate on the previous engine cycle. A further aspect includes detecting if the at least one cylinder has failed to deactivate a predetermined number of times within a predetermined number of engine cycles. Yet a further aspect includes incrementing an oil control valve deactivate response time by a predetermined increment if incrementing the response time will not exceed a predetermined maximum response threshold when the at least one cylinder has failed to deactivate a predetermined number of times within a predetermined number of engine cycles.

Another aspect in accordance with the exemplary embodiment includes incrementing a deactivation fail counter when the at least one cylinder activates on the next engine cycle. Still another aspect includes resetting the deactivation fail counter after incrementing the oil control valve deactivation response time by a predetermined increment or if incrementing the response time will exceed the predetermined maximum threshold. And another aspect wherein detecting a high pressure exhaust charge spring further comprises detecting if the at least one cylinder has had high pressure exhaust charge spring conditions a predetermined number of times within a predetermined number of engine cycles when a high pressure exhaust charge is detected.

Yet another aspect of the exemplary embodiment includes decrementing an oil control valve deactivate response time by a predetermined decrement if decrementing the response time will not exceed a predetermined minimum response threshold when the at least one cylinder has had high pressure exhaust charge spring conditions a predetermined number of times within a predetermined number of engine cycles. And still another aspect in accordance with the embodiment includes incrementing a deactivation fail counter when the at least one cylinder activates on the next engine cycle. Another aspect in accordance with the embodiment includes resetting the deactivation fail counter after incrementing the oil control valve deactivation response time by a predetermined increment or if incrementing the response time will exceed the predetermined maximum threshold.

Still in accordance with the exemplary embodiment, the method includes determining if conditions are met for cylinder reactivation when conditions for deactivation are not met. Yet other aspects include commanding at least one cylinder to reactivate when the conditions for reactivation are met and detecting whether the at least one cylinder reactivated has misfired. And yet other aspects in accordance with the exemplary embodiment include detecting if the at least one cylinder misfired on a next engine cycle if the at least one cylinder misfired on the previous engine cycle, and detecting if the at least one cylinder has misfired a predetermined number of times within a predetermined number of engine cycles.

Still another aspect of the exemplary embodiment includes incrementing an oil control valve reactivate response time by a predetermined increment if incrementing the response time will not exceed a predetermined maximum response threshold when the at least one cylinder has misfired a predetermined number of times within a predetermined number of engine cycles. And further aspects include incrementing a reactivation fail counter when the at least one cylinder does not misfire on the next engine cycle, and resetting the reactivation fail counter after incrementing the oil control valve reactivation response time by a predetermined increment or if incrementing the response time will exceed the predetermined maximum threshold.

Yet further aspects in accordance with the exemplary embodiment includes setting an engine fault code when the at least one cylinder failed to deactivate on the next cycle, and setting an engine fault code when the at least one cylinder misfires on the next cycle. And yet another aspect wherein detecting if a high pressure exhaust spring further includes monitoring cylinder gas properties of the at least one cylinder. Still another aspect wherein detecting if the at least one cylinder fails to deactivate further includes monitoring actuation of the at least one cylinder with a proximity sensor. And one other aspect wherein determining if the at least one cylinder reactivated has misfired further includes detecting a misfire of the at least one cylinder reactivated based on examining firing opportunities of the at least one cylinder reactivated, a cylinder sequentially before the at least one cylinder and a cylinder after the at least one cylinder.

BRIEF DESCRIPTION OF THE DRAWINGS

The present exemplary embodiment will hereinafter be described in conjunction with the following drawing figures, wherein like numerals denote like elements.

DETAILED DESCRIPTION

The following detailed description is merely exemplary in nature and is not intended to limit the embodiment or the application and uses thereof. Furthermore, there is no intention to be bound by any theory presented in the preceding background or the following detailed description.

Figure 1:
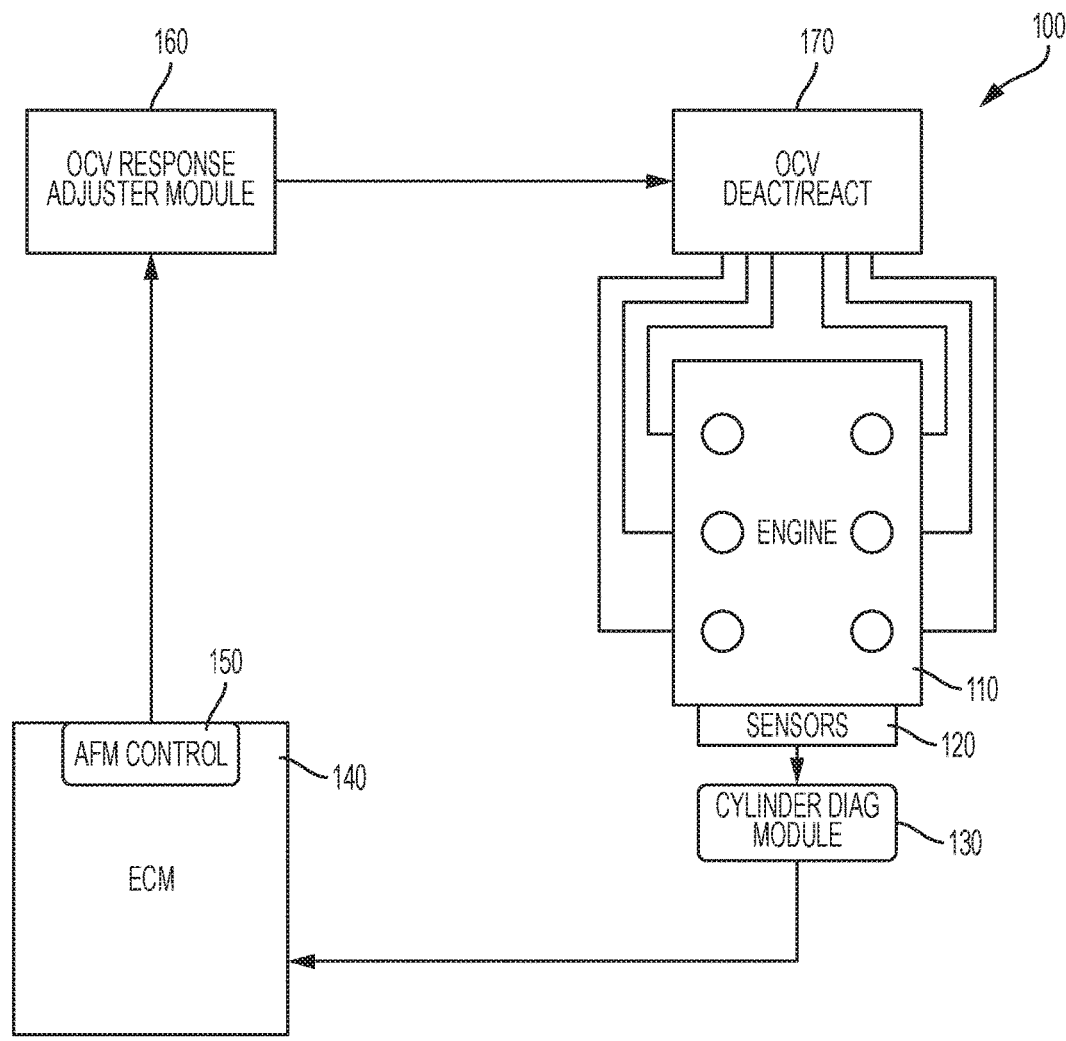
FIG. 1 is an illustration of a system diagram of an oil control valve system for an engine in accordance with aspects of an exemplary embodiment.

In accordance with the disclosed embodiment, FIG. 1 of a system diagram of an oil control valve system 100 for an engine in accordance with aspects of an exemplary embodiment. An engine 110 includes six (6) cylinders that are configured for active fuel management operation in accordance with aspects of the exemplary method. It is appreciated that the engine 110 may include 4, 6, 8, 12 or other number of cylinders wherein the method to adjust an oil control valve actuation response time using cylinder valve diagnostics could be applied without deviating from the scope of the exemplary embodiment. The engine 110 may be an internal combustion engine (ICE) such as a gasoline, Diesel or flex fuel engine, or a hybrid and is in communication with a plurality of sensors 120.

The sensors 120 are operative to monitor and provide real time data to an engine controller or other control units in accordance with aspects of the exemplary embodiment. The sensors can include, for example, engine speed sensors such as a crank position sensor that can detect position and/or speed of a crankshaft and/or a cam position sensor that can detect position and/or speed of a camshaft, and provide that information to an engine controller.

For example, the crank position sensor can be used to detect position of crankshaft, and the cam position sensor can be used to detect position of camshaft (not illustrated). In either case, the raw position signal (in terms of frequency (Hz)) can be sent to controller and conditioned/converted to speed (in terms of rpm). In this regard, the engine speed signals may be considered raw engine speed signals until signal conditioned by the controller or other signal conditioning circuitry. The sensors 120 can also include a wheel speed sensor that can detect true vehicle speed and provide it to the controller.

Sensors 120 can include proximity sensors for monitoring movement of the intake and exhaust valves of an engine cylinder, an accelerometer for monitoring engine knock or misfires, a torque sensor for measuring torque out of the engine, and a manifold air pressure sensor for monitoring the air intake pressure of the engine. Other pressure sensors can be included to monitor the real time pressure of each cylinder in accordance with the exemplary embodiment. Sensors 120 can include special circuits for monitoring the electrical characteristics of each cylinder before and after combustion cycle in accordance with aspects of the exemplary embodiment.

A cylinder diagnostic module 130 is in communication with engine 110 and sensors 120 and is operative to receive real time information of engine cylinder parameters such as internal pressures, intake and exhaust valve operation, cylinder deactivate/reactivate events, cylinder torque output, and other cylinder fault conditions in accordance with aspects of the exemplary embodiment. It is appreciated that the cylinder diagnostic module 130 may be a standalone unit or may be integrated within the engine controller without deviating from the scope of the embodiment.

An engine control module (ECM) 140 receives engine cylinder diagnostic information from the cylinder diagnostic module 130, sensors 120 and the engine 110. The ECM 140 is a controller, microprocessor or other electronic device that performs a variety of engine monitoring and control tasks. The ECM 140 reads data from various engine sensors and modules, and processes that data to control a series of actuators associated with the engine to ensure optimal performance in accordance with the embodiment. The ECM 140 also includes a counter (not shown) for tracking the number of AFM failure events in accordance with aspects of the exemplary embodiment.

An active fuel management (AFM) control unit 150 is integrated within the ECM 140 and is operative to use an oil control valve (OCV) solenoid (not shown) to deactivate/reactivate selected engine cylinders under light-load conditions to improve fuel economy. The response times of individual OCV solenoids can vary relative to causing deactivation/reactivation of cylinder intake and exhaust valves due to a number of factors such AFM system design, component variances, or other conditions.

Currently, estimation of OCV response times by the ECM 140 is an open loop exercise. Accurate estimation of cylinder OCV response times is needed for achieving properly timed valve disable and enable events. The exemplary method seeks to use known cylinder diagnostic techniques to detect when an AFM fault condition occurs due to an inaccurately estimated OCV response time, and to cause the ECM 140 to adjust the OCV response time by an estimated amount to attempt to eliminate the AFM fault condition.

An OCV response adjuster module 160 is in communication with the AFM control unit 150 and/or the ECM 140. The adjuster module 160 is operative to receive instruction from the AFM control unit 150 and/or the ECM 140 to increment or decrement the oil control valve actuation response time by a predetermined increment/decrement if incrementing/decrementing the response time will not exceed a predetermined maximum/minimum response threshold in accordance with the exemplary embodiment. For example, if the current response time is 20 ms and the maximum response threshold 25 ms then the adjuster module 160 would ignore a command from the ECM 140 is to increment the response time by another 10 ms.

A plurality of OCV solenoids 170 are in communication with the adjuster module 160. The OCV solenoids are operative to deactivate/reactive the cylinder intake and exhaust valve in accordance with the commands received from the ECM 140 via the adjuster module 160. In accordance with aspects of the exemplary embodiment, the intake and exhaust valves of each cylinder can be deactivated/reactivated by respective OCV solenoids 170.

Figure 2A:
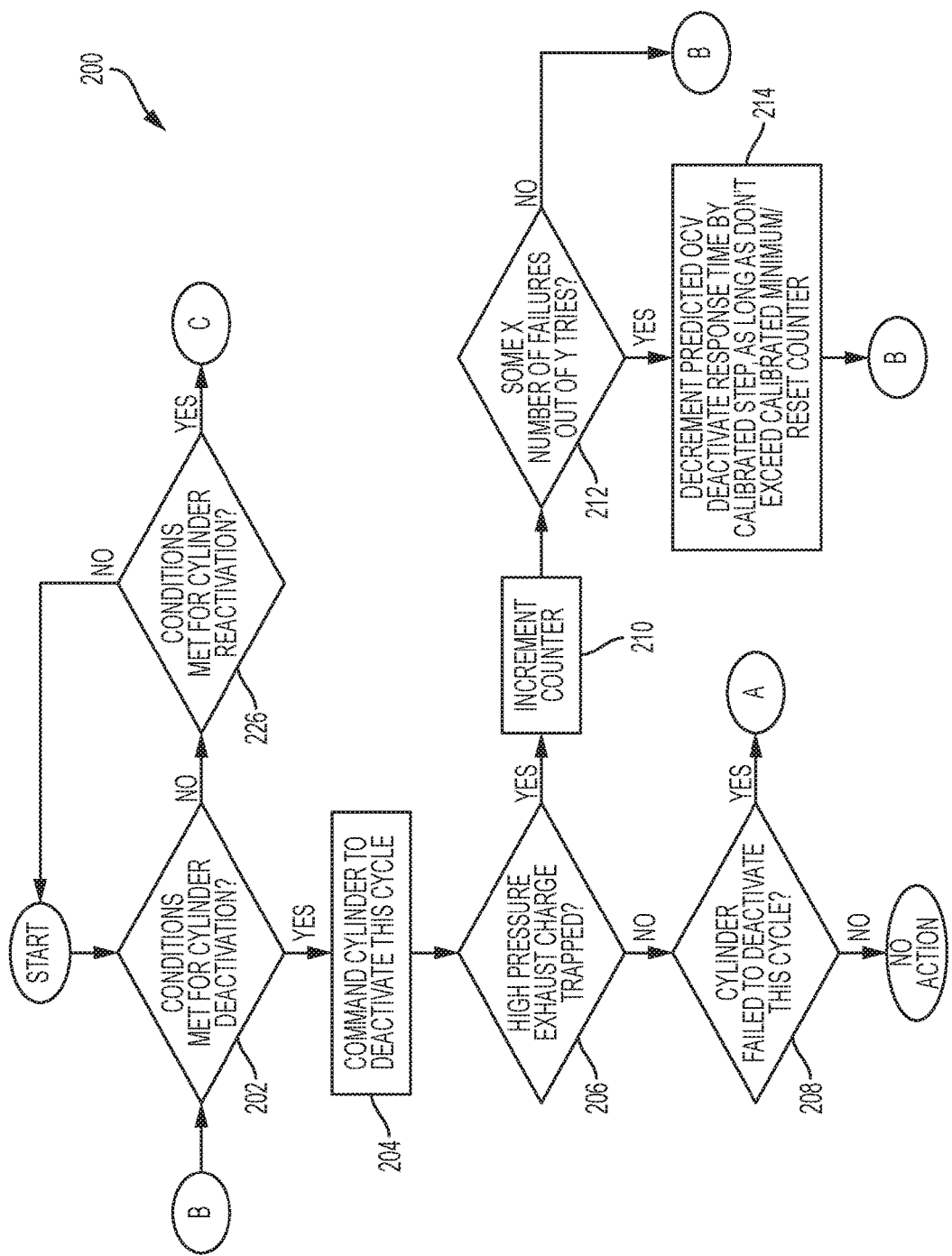
FIG. 2A is an illustration of an algorithm for the method to adjust an oil control valve actuation response time using cylinder valve diagnostics. in accordance with aspects of the exemplary embodiment.

Referring now to FIG. 2*a*, an illustration of an algorithm 200 for the method to adjust an oil control valve actuation response time using cylinder valve diagnostics in accordance with aspects of the exemplary embodiment is provided. At block 202, the method begins with determining if conditions are met for cylinder deactivation. Conditions for engine deactivation may include low engine load, flat road conditions, relatively constant vehicle speed, and other factors which would cause the ECM 140 to command AFM control for the vehicle. It is appreciated that references to cylinder deactivation or reactivation relate to the singular as well as the plural where one or more cylinders may be deactivated or reactivation in an instance. If the conditions are not met for cylinder deactivation then the method jumps to block 226 discussed below. If conditions are met for deactivation then the method moves to block 204.

At block 204, a command to deactivate at least one cylinder in the current engine cycle is sent to the OCV solenoids 170. After the commanded cylinder(s) have been deactivated then, at block 206, the method continues with detecting if a HPES exist within any of the deactivated cylinder(s). If there is no HPES detected in the deactivated cylinder(s) then the method moves to block 208. If there is a HPES detected in the deactivated cylinder(s) then the method continues at block 210 below. Opening an intake valve when a HPES exists within the cylinder can cause damage to the intake valve or other components within the valve train due to the high pressure and should be avoided.

At block 208, the method continues with detecting if the cylinder(s) has failed to deactivate in the current engine cycle when a high pressure exhaust charge spring is not detected. It is appreciated that the detection of a HPES condition is handled by the cylinder diagnostic module 130 using known techniques in accordance with the exemplary embodiment, for example, by monitoring cylinder gas properties of the at least one cylinder. If it is detected that the cylinder(s) has not failed to deactivate during the current engine cycle then no action is taken. If it is detected that the cylinder(s) has failed to deactivate during the current engine cycle then the method jumps to block 216 below.

At block 210, the method continues with incrementing a counter to keep track of the HPES conditions detected when the cylinder(s) has been commanded to deactivate.

At block 212, the method continues with detecting if the cylinder(s) has had HPES conditions a predetermined number of times within a predetermined number of engine cycles. If the cylinder(s) is detected to have had HPES conditions a predetermined number of times within a predetermined number of engine cycles then the method moves to block 214. If the cylinder(s) is has not had HPES conditions a predetermined number of times within a predetermined number of engine cycles then the method returns to block 202 because enough failures have not yet occurred to justify adjusting the OCV deactivate response time.

At block 214, the method continues with decrementing an oil control valve deactivate response time by a predetermined decrement if decrementing the response time will not exceed a predetermined minimum response threshold when the at least one cylinder has had high pressure exhaust charge spring conditions a predetermined number of times within a predetermined number of engine cycles. A further step includes resetting the failure counter. The method then returns to block 202 after executing block 214.

Figure 2B:
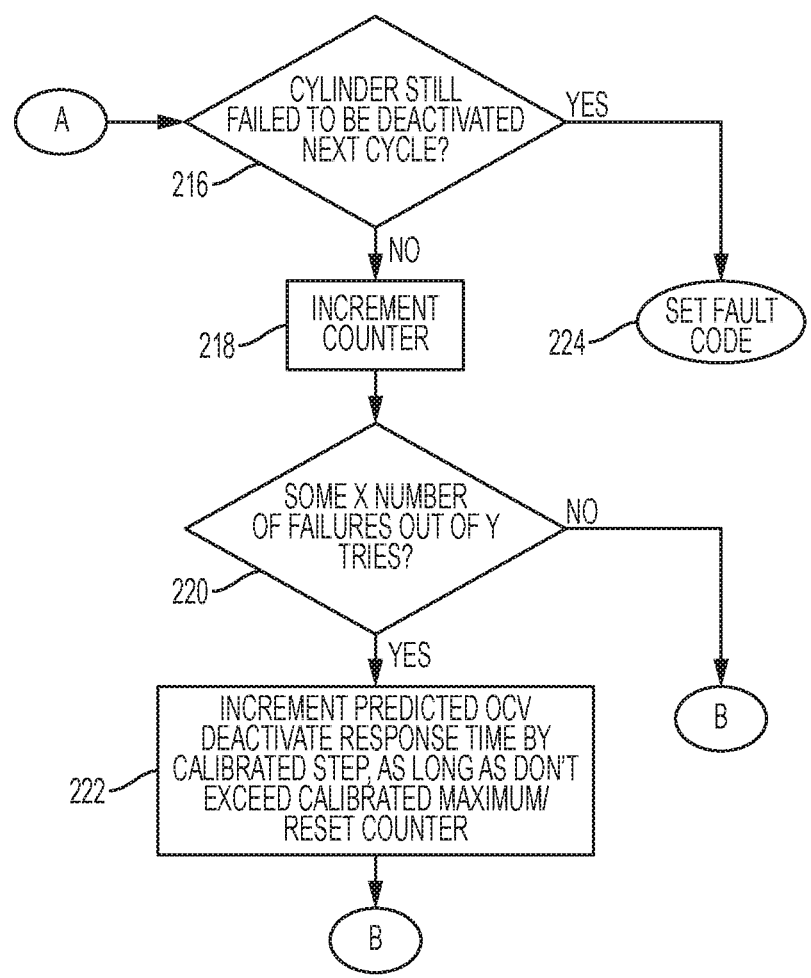
FIG. 2B continues the illustration of an algorithm for the method to adjust an oil control valve actuation response time using cylinder valve diagnostics. in accordance with aspects of the exemplary embodiment.

Referring to FIG. 2*b*, the method continues at block 216 with detecting if the at least one cylinder has failed to deactivate on a next engine cycle if the at least one cylinder failed to deactivate on the previous engine cycle. A determination of whether the at least one cylinder has failed to deactivate may be accomplished by monitoring actuation of the at least one cylinder with proximity sensors, or other methods, but such determination is handled by the cylinder diagnostic module 130 in accordance with aspects of the exemplary embodiment. If the at least one cylinder has not failed to deactivate on the next engine cycle then, at block 218, a deactivate failure counter is incremented. If the at least one cylinder has still failed to deactivate on the next engine cycle then the method proceeds to block 224 below.

At block 220, the method includes detecting if the at least one cylinder has failed to deactivate a predetermined number of times within a predetermined number of engine cycles. If the at least one cylinder has failed a predetermined number of times within a predetermined number of engine cycles then, at block 222, then the method continues with incrementing an oil control valve deactivate response time by a predetermined increment if incrementing the response time will not exceed a predetermined maximum response threshold. A further step includes resetting the failure counter.

If the at least one cylinder has not failed a predetermined number of times within a predetermined number of engine cycles then the method returns to block 202 because enough failures have not yet occurred to justify adjusting the OCV deactivate response time.

At block 224, if it is detected that the at least one cylinder has still failed to deactivate on the next engine cycle then the method continues with setting an engine fault code because it is likely that if the at least one cylinder failed to deactivate on two consecutive cycles then such occurrence is probably not an OCV response time issue. The method then returns to block 202.

Figure 2C:
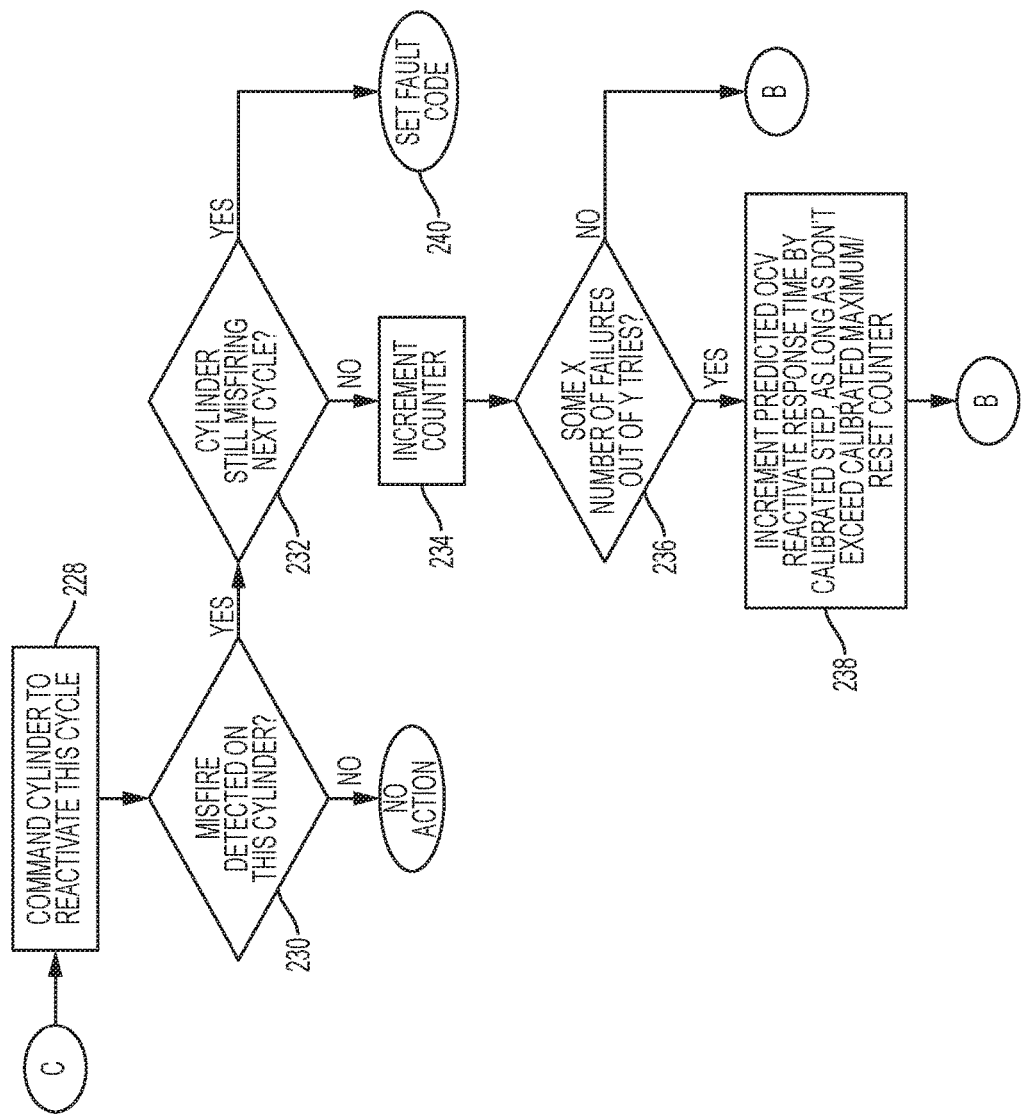
FIG. 2C still continues the illustration of an algorithm for the method to adjust an oil control valve actuation response time using cylinder valve diagnostics. in accordance with aspects of the exemplary embodiment.

Referring again to FIG. 2a, at block 226 the method continues with determining if conditions are met for cylinder reactivation when conditions for deactivation are not met. If conditions are met for cylinder reactivation then the method moves to FIG. 2c, block 228 for commanding the at least one cylinder to reactivate in the current engine cycle.

Referencing block 230, the method continues with detecting whether the at least one cylinder reactivated has misfired. Again, it is appreciated that detecting regarding whether or not the at least one cylinder has misfired, or failed to deactivate/reactivate is handled by the cylinder diagnostic module 130 using know techniques in accordance with aspects of the exemplary embodiment. For example, a misfire condition may be determined based on examining the firing opportunities of the at least one cylinder reactivated, a cylinder sequentially before the at least one cylinder and a cylinder sequentially after the at least one cylinder. If the at least one cylinder has misfired during the current engine cycle then the method continues at block 232. If the at least one cylinder has not misfired then no action is taken.

At block 232, the method continues with detecting if the at least one cylinder misfired on a next engine cycle if the at least one cylinder misfired on the previous engine cycle. If the at least one cylinder does not misfire on the next engine cycle then, at block 234, a misfire counter is incremented to keep track of the number of misfires. If the at least one cylinder is detected to have misfired during the next engine cycle then the method moves to block 240 below.

At block 236, the method continues with detecting if the at least one cylinder has misfired a predetermined number of times within a predetermined number of engine cycles. If the at least one cylinder is determined to have misfired a predetermined number of times within a predetermined number of engine cycles then the method moves to block 238 for incrementing an oil control valve reactivate response time by a predetermined increment if incrementing the response time will not exceed a predetermined maximum response threshold and a further step includes resetting the failure counter. Next, the method returns to block 202. If the at least one cylinder has not misfired a predetermined number of times within a predetermined number of engine cycles then the method returns to block 202 because enough failures have not yet occurred to justify adjusting the OCV reactivate response time.

At block 240, the method continues with setting an engine fault code when the at least one cylinder still misfires on the next cycle because it is likely that if the at least one cylinder misfires on two consecutive cycles then such occurrence is probably not an OCV response time issue. The method then returns to block 202.

The detailed description provides those skilled in the art with a convenient road map for implementing the exemplary embodiment or exemplary embodiments. Many modifications and variations will be apparent to those of ordinary skill in the art without departing from the scope and spirit of the invention. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method to adjust an oil control valve actuation response time using cylinder valve diagnostics comprising:
    determining if conditions are met for cylinder deactivation;
    commanding at least one cylinder to deactivate when conditions for deactivation are met;
    detecting if a high pressure exhaust charge spring is within the at least one deactivated cylinder;
    detecting if the at least one cylinder has failed to deactivate if a high pressure exhaust charge spring is not detected;
    detecting if the at least one cylinder has failed to deactivate on a next engine cycle if the at least one cylinder failed to deactivate on the previous engine cycle;
    detecting if the at least one cylinder has failed to deactivate a predetermined number of times within a predetermined number of engine cycles; and
    incrementing an oil control valve deactivate response time by a predetermined increment if incrementing the response time will not exceed a predetermined maximum response threshold when the at least one cylinder has failed to deactivate a predetermined number of times within a predetermined number of engine cycles.

2. The method of claim 1 further comprising incrementing a deactivation fail counter when the at least one cylinder activates on the next engine cycle.

3. The method of claim 2 further comprising resetting the deactivation fail counter after incrementing the oil control valve deactivation response time by a predetermined increment or if incrementing the response time will exceed the predetermined maximum threshold.

4. The method of claim 1 wherein detecting a high pressure exhaust charge spring further comprises detecting if the at least one cylinder has had high pressure exhaust charge spring conditions a predetermined number of times within a predetermined number of engine cycles when a high pressure exhaust charge spring has been detected.

5. The method of claim 4 further comprising decrementing an oil control valve deactivate response time by a predetermined decrement if decrementing the response time will not exceed a predetermined minimum response threshold when the at least one cylinder has had high pressure exhaust charge spring conditions a predetermined number of times within a predetermined number of engine cycles.

6. The method of claim 5 further comprising incrementing a deactivation fail counter when the at least one cylinder activates on the next engine cycle.

7. The method of claim 6 further comprising resetting the deactivation fail counter after incrementing the oil control valve deactivation response time by a predetermined increment or if incrementing the response time will exceed the predetermined maximum threshold.

8. The method of claim 1 further comprising determining if conditions are met for cylinder reactivation when conditions for deactivation are not met.

9. The method of claim 8 further comprising commanding at least one cylinder to reactivate when the conditions for reactivation are met.

10. The method of claim 9 further comprising detecting whether the at least one cylinder reactivated has misfired.

11. The method of claim 10 wherein determining if the at least one cylinder reactivated has misfired further comprises detecting a misfire of the at least one cylinder reactivated based on examining firing opportunities of the at least one cylinder reactivated, a cylinder sequentially before the at least one cylinder and a cylinder after the at least one cylinder.

12. The method of claim 10 further comprising detecting if the at least one cylinder misfired on a next engine cycle if the at least one cylinder misfired on the previous engine cycle.

13. The method of claim 12 further comprising setting an engine fault code when the at least one cylinder misfires on the next cycle.

14. The method of claim 12 further comprising detecting if the at least one cylinder has misfired a predetermined number of times within a predetermined number of engine cycles.

15. The method of claim 14 further comprising incrementing an oil control valve reactivate response time by a predetermined increment if incrementing the response time will not exceed a predetermined maximum response threshold when the at least one cylinder has misfired a predetermined number of times within a predetermined number of engine cycles.

16. The method of claim 15 further comprising incrementing a reactivation fail counter when the at least one cylinder does not misfire on the next engine cycle.

17. The method of claim 16 further comprising resetting the reactivation fail counter after incrementing the oil control valve reactivation response time by a predetermined increment or if incrementing the response time will exceed the predetermined maximum threshold.

18. The method of claim 1 further comprising setting an engine fault code when the at least one cylinder failed to deactivate on the next cycle.

19. The method of claim 1 wherein detecting if a high pressure exhaust spring further comprises monitoring cylinder gas properties of the at least one cylinder.

20. The method of claim 1 wherein detecting if the at least one cylinder fails to deactivate further comprises monitoring actuation of the at least one cylinder with a proximity sensor.

* * * * *